March 25, 1924.
B. A. VANDY
ATTACHING MEANS FOR ELECTRICAL FIXTURES
Filed June 14, 1921
1,488,078
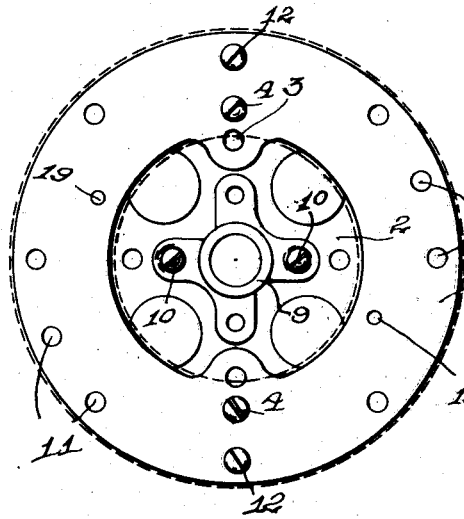
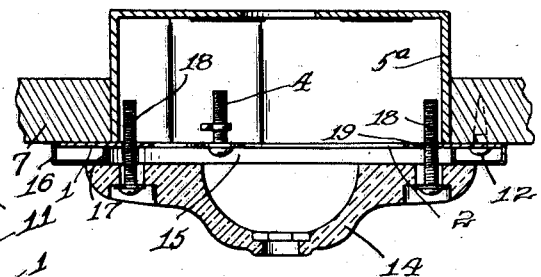
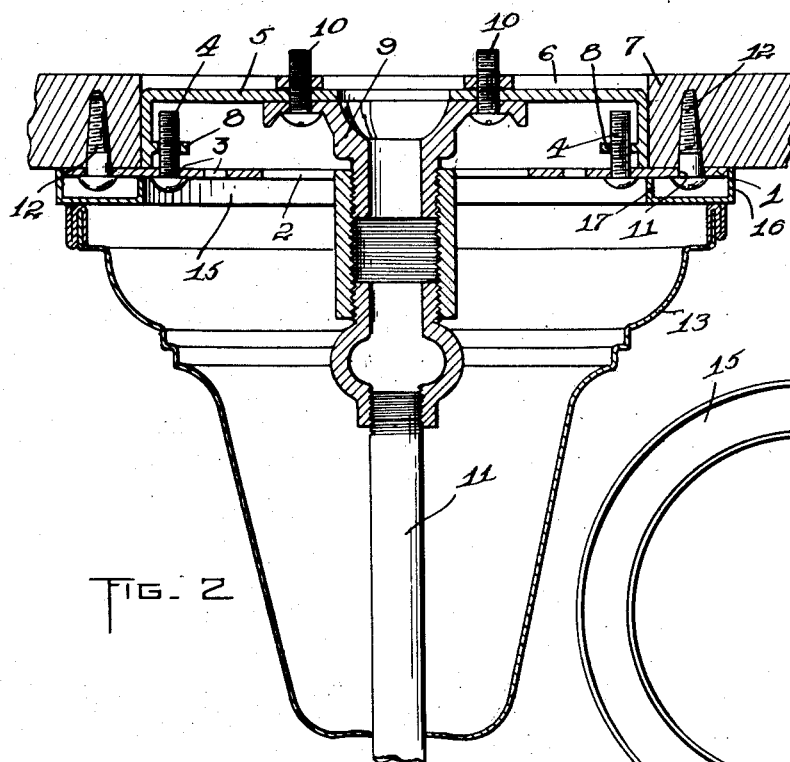
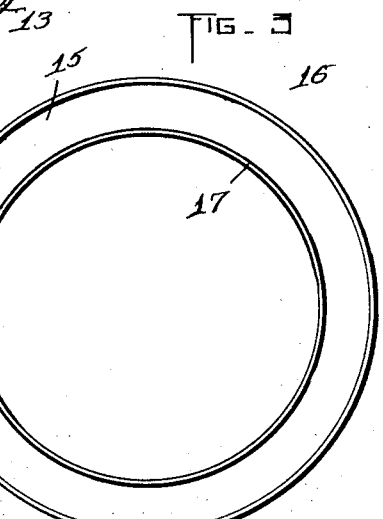
INVENTOR
Burton A. Vandy
BY
Davis & Timms
his ATTORNEYS Patented Mar. 25, 1924.

1,488,078

UNITED STATES PATENT OFFICE.

BURTON A. VANDY, OF ROCHESTER, NEW YORK, ASSIGNOR TO SARAH VANDY, OF ROCHESTER, NEW YORK.

ATTACHING MEANS FOR ELECTRICAL FIXTURES.

Application filed June 14, 1921. Serial No. 477,600.

*To all whom it may concern:*

Be it known that I, BURTON A. VANDY, a citizen of the United States, and resident of Rochester, in the county of Monroe and State of New York, have invented certain new and useful Improvements in Attaching Means for Electrical Fixtures, of which the following is a specification.

The present invention relates to attaching means for electrical fixtures and more particularly to the securing of outlet boxes to the walls and ceilings of old buildings, an object of this invention being to provide a means which will permit the mounting of outlet boxes in old houses or buildings without requiring the disfiguration of the walls or ceilings so that a retouching of such walls or ceilings is required after the installation of the boxes.

To this and other ends the invention consists of certain parts and combinations of parts, all of which will be hereinafter described, the novel features being pointed out in the appended claims.

In the drawings:

Fig. 1 is a face view of the supporting member or plate with an outlet box attached thereto;

Fig. 2 is a sectional view through a fragment of an electrical fixture showing the manner in which a canopy cooperates with the supporting member;

Fig. 3 is a face view of one side of the abutment ring; and

Fig. 4 is a view showing the manner in which a porcelain cover is employed in connection with this invention.

In the installation of an outlet box in a wall or ceiling of an old building, it has heretofore been the general custom to cut a large hole so as to anchor the outlet box in some manner within the wall. This has required considerable time and in addition has necessitated the preparing of a large gap in the wall about the outlet box.

According to this invention, only an opening slightly larger than the outlet box is required to be made in the wall and a supporting member is provided to which the box is secured and which is secured to the wall or ceiling about the box, covering the opening in the wall so that the repairing of the wall is unnecessary. This supporting member, in this instance, is in the form of a circular plate 1 preferably having a central opening 2 and also openings 3. These openings 3 are adapted to have passed therethrough the screws 4 for securing the outlet box 5 within the opening 6 made in the wall or ceiling 7. In Fig. 2 the outlet box is shallow in form and of known construction, the screws 4 passing through lips or tongues 8 formed on the inner wall of the box. An anchoring piece 9 is secured in the usual manner to the bottom of the box by screws 10 and serves to support the fixture stem 11 in a well-known manner. In Fig. 4 the box 5ª is of a deeper construction. The supporting plate is also provided with an annular series of openings 11 through which screws 12 are passed to engage the wall or ceiling 7 about the outlet box.

For the purpose of covering the heads of the screw 12 and at the same time providing an abutment for a canopy 13 as shown in Fig. 2, a porcelain cover 14 as shown in Fig. 4 or other suitable fixture part, a ring 15 is provided which in this instance, has two flanges 16 and 17, the flange 17 cooperating with the outer face of the plate 1 and the flange 16 cooperating with the edge of the plate 1 and being of greater height than the flange 17, the distance being substantially equal to the thickness of the supporting plate 1. It will be apparent that by this arrangement the supporting plate 1 is entirely hidden from view and at the same time the heads of the screws 12 are covered so that the canopy 13, the porcelain cover 14, or other suitable fixture part may obtain proper abutment. The abutment ring 15 may be made of material which will give an ornamental effect at the base of the fixture. The canopy 13 is held in a common manner, not shown, in abutting relation with the ring 15, while the cover plate 14 may be secured to the supporting plate 1 by screws 18 passing through said cover plate and finding anchorage in openings 19 formed in the supporting plate 1.

From the foregoing it will be seen that there has been provided an attaching means for electrical fixtures which will permit the mounting of outlet boxes in walls and ceilings of old buildings without the destruction of such walls or ceilings so that a repairing of the walls is required about the boxes. The box is supported by a plate which is secured to the wall or ceiling about the opening and effectively covers the space between the box and the wall of such opening. Associated with this supporting plate is an abutment ring for part of the electrical fixture, this ring not only covering the edge of the plate, but also covering the heads of the screws which anchor the plate so that proper abutment for the fixture part is obtained. This invention also does away with the necessity of tearing up floors in order to install a box in a ceiling.

What I claim as my invention and desire to secure by Letters Patent is:

1. A supporting plate for standard outlet boxes having a central opening and formed with a series of supporting fastener openings near its periphery, said plate also having openings for the passage of securing fasteners for an outlet box, the last mentioned openings being so positioned with reference to the supporting fastener openings that a standard outlet box will lie with its edge in abutment when the inner surface of the supporting plate between the supporting fastener openings and the openings through which the securing fasteners for the outlet box pass.

2. The combination with a supporting plate having a central opening, a series of fastener openings near its periphery, and openings within the series of fastener openings for anchoring an outlet box on one side of the supporting plate, of an abutment ring having a pocketed face receiving and covering the heads of said series of fastener openings and serving as an abutment for a fixture part.

3. The combination with a supporting plate having a central opening, a series of fastener openings near its periphery, and openings within the series of fastener openings for anchoring an outlet box on one side of the supporting plate, of an abutment ring covering said series of fastener openings and serving as an abutment for a fixture part, said ring having two annular ring shaped flanges, the outer one of which projects beyond the inner one and surrounds the edge of the supporting plate.

BURTON A. VANDY.